May 27, 1930. E. B. WHITMARSH 1,760,222
VALVE AND COCK
Filed Jan. 8, 1927

Inventor
Ernest B. Whitmarsh,
By
Attorneys

Patented May 27, 1930

1,760,222

UNITED STATES PATENT OFFICE

ERNEST B. WHITMARSH, OF DETROIT, MICHIGAN, ASSIGNOR TO DETROIT BRASS AND MALLEABLE WORKS, OF DETROIT, MICHIGAN, A CORPORATION OF MICHIGAN

VALVE AND COCK

Application filed January 8, 1927. Serial No. 159,773.

My invention aims to provide a novel valve or cock construction wherein a countersunk and partially concealed stop member limits the adjustment of a plug in the valve or cock body. In such valvular structures it is the common practice to provide an end of the plug with a pin or shoulder engageable with a complemental pin or shoulder of the cock body, to define an opened or closed position of the plug. Such construction, as well as others permits of the accumulation of dirt and foreign matter which in time interferes with full adjustment of the cock plug. Then again, pins and other protuberances are liable to be broken, and at the best do not contribute to the appearance of a well designed cock, especially when used in connection with a gas range or the like.

My improved construction prevents the lodgment of dirt, insures a positive stop action for the cock plug, eliminates all stop protuberances, and provides a construction that may be manufactured at a comparatively small cost.

Other advantages of my invention will appear as the construction is better understood by reference to the drawing and the detail description thereof.

Figure 1:
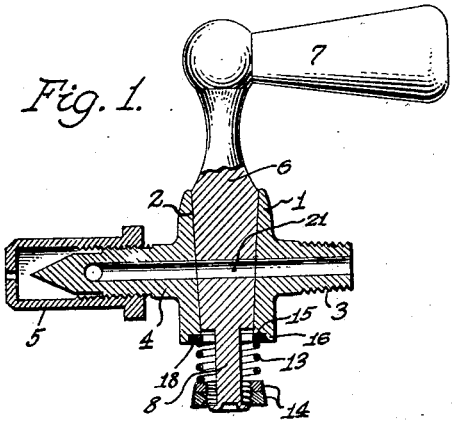
Figure 1 is a vertical longitudinal sectional view of the valve or cock, partly in elevation, showing the cock in an open position.
Figure 2:
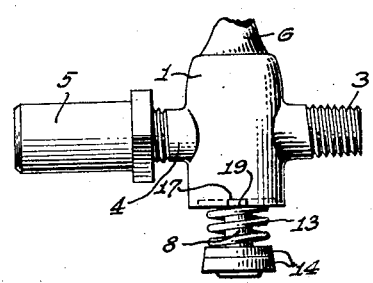
Fig. 2 is a side elevation of the same, partly broken away.

In the drawing, the reference numeral 1 denotes a cock body having a tapered plug seat or bore 2 which is tapered inwardly from the upper end of the body to the lower end thereof. The body is provided with diametrically opposed inlet and outlet connections 3 and 4 respectively communicating with the bore or plug seat 2 of the cock body. The outlet connection 4 may be provided with a gas and air mixer or nozzle 5, or may be of any well known construction.

Rotatable in the bore or on the seat 2 of the cock body 1 is a tapered plug 6 having the upper end thereof provided with a conventional form of handle 7. The tapered portion of the plug 6 may be of less length than the tapered seat 2 and the lower end of the plug terminates in a stem or tang 8 having opposed facets 9 and 10. The lower portion of the stem is reduced, as at 11, and screw-threaded, as at 12. This stem may be considered as having been originally cylindrical, had its lower end reduced and screw-threaded and then opposed sides thereof cut away or flattened so as to form the facets 9 and 10.

For rotatably retaining the plug 6 on its seat 2 a coiled spring 13 and an abutment 14 are employed. The abutment 14 may be in the form of washers or jam nuts screwed on the threaded portions 12 of the plug stem, and in some instances the extremity of the plug stem may be peened or otherwise upset to prevent unscrewing or displacement of the abutment 14.

The spring 13 is of the coiled type encircling the stem with its expansive force exerting a downward pressure on the plug 6 so as to retain said plug in frictional engagement with the seat 2.

Figure 4:
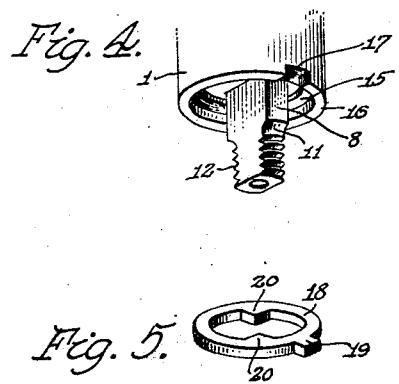
Fig. 4 is a perspective view of a portion of the cock body with a naked plug stem or tang protruding therefrom.
Figure 3:
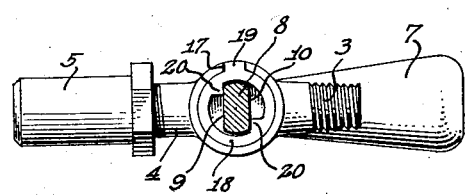
Fig. 3 is a bottom plan of the cock partly in horizontal section.
Figure 5:
Fig. 5 is a perspective view of a detached stop or washer member.

The lower end of the cock body is counterbored to provide an annular seat 15 about or at the lower end of the seat 2, and the formation of the seat 15 provides an annular vertical wall or protecting flange 16. This wall or flange has a single radially disposed slot or notch 17, best shown in Figs. 3 and 4. Counterboring the lower end of the cock body provides a recess for a washer or ring-like stop member 18 which when properly fitted in the counterbored lower end of the cock body is flush with the lower end and partly concealed. The exposed face of the stop member affords an end abutment for the coiled spring 13, as best shown in Fig. 1.

The outer annular wall of the stop member 18 has a radially disposed lug 19 extending into the slot or notch 17 to prevent rotation of the stop member in the cock body. The inner wall of the stop member 18 is formed with diametrically opposed double shouldered inwardly extending lugs 20 engageable by the facets 9 and 10 of the plug stem 8. The lugs 20 are of such size and so disposed that the shoulders of said lugs will be in parallel planes with the planes of one set of shoulders at a right angle to the planes of the other set of shoulders, whereby the lugs 20 may cooperate in limiting rotation of the stem 8 and confine such rotation to a quarter turn or approximately ninety degrees. This will insure alinement of a plug passage 21 with the connections 3 and 4 or closure of such passage by the same being placed transverse to the axis of the connections 3 and 4.

Obviously the cock body can be cast or otherwise formed to provide the recess and notch for the stop member 18; that this stop member can be easily and quickly produced and readily assembled, and while in the drawing there is illustrated a preferred embodiment of my invention, it is to be understood that the cock construction is susceptible of such changes as are permissible by the appended claims.

What I claim is:—

1. The combination of a cock body having inlet and outlet connections, said cock body having the lower end thereof provided with a slot and a recess, a rotatable plug in said body and having a stem protruding from the lower end of said body, said stem having a pair of parallel facets formed thereon and extending entirely across the same, a stop member mounted in the recess of the cock body and projecting into the slot thereof to prevent rotation of said stop member relative to said cock body, and inwardly projecting means carried by said stop member and engageable by the facets of said stem for defining the rotation of said plug in said cock body.

2. In a valve of the class described, a valve casing having a tapered valve seat and having a counterbore surrounding the small end of the tapered valve seat, a rotatable valve plug disposed in the seat and having a flattened portion extending through the counterbore end of the casing and some distance therebelow, that portion of the plug which is within the counterbore providing shoulders, a stop washer disposed in the counterbore and having abutments for said plug shoulders whereby to limit movement of the plug, a nut screwed to the lower projecting end of the flattened portion of the rotatable valve plug, and a spring arranged on said flattened portion and bearing at its lower end against the nut and at its opposite end against the stop washer and serving both to hold the plug to its seat and the stop washer in its locking position.

3. In a valve of the class described, a valve casing having a tapered valve seat and having a counterbore surrounding the small end of the tapered valve seat, a rotatable valve plug disposed in the seat and having a longitudinally recessed portion on its lower end adapted to be arranged partly within said counterbore, said recessed portion providing shoulders, a washer adapted to slide on said plug into said counterbore and having a stop tooth projecting into the recess to cooperate with said shoulders in limiting the rotation of the valve plug, and means for locking said washer to the valve casing.

4. In a valve of the class described, a valve casing having a tapered valve seat and having a counterbore surrounding the small end of the tapered valve seat, a rotatable valve plug disposed in the seat and having a screw-threaded stem on its small end extending through said counterbore, said screwthreaded stem having a a longitudinally recessed portion providing shoulders, a washer adapted to slide on said stem to a position in the counterbore and having a stop tooth projecting into the recess to cooperate with said shoulders in limiting rotation of the valve plug, means for locking the washer against rotation with reference to the valve casing, a nut screwed on the outer end of the threaded stem, and a compression spring surrounding the stem and bearing at its lower end against the nut and at its upper end against the stop washer, the spring serving both to hold the plug to its seat and the stop washer in its locking position.

In testimony whereof I affix my signature.

ERNEST B. WHITMARSH.